United States Patent
Wehner et al.

(10) Patent No.: US 10,870,763 B2
(45) Date of Patent: *Dec. 22, 2020

(54) COATING SYSTEMS, USE THEREOF FOR COATING COMPONENTS AND THUS COATED COMPONENTS FOR AGRICULTURAL AND CONSTRUCTION MACHINES

(71) Applicant: MANKIEWICZ GEBR. & CO. GMBH & CO. KG, Hamburg (DE)

(72) Inventors: Jochen Wehner, Hamburg (DE); Andrea Costa, Hamburg (DE)

(73) Assignee: MANKIEWICZ GEBR. & CO. GMBH & CO. KG, Hamburg (DE)

( * ) Notice: Subject to any disclaimer, the term of this patent is extended or adjusted under 35 U.S.C. 154(b) by 328 days.

This patent is subject to a terminal disclaimer.

(21) Appl. No.: 15/567,372

(22) PCT Filed: Apr. 20, 2016

(86) PCT No.: PCT/DE2016/000165
§ 371 (c)(1),
(2) Date: Oct. 18, 2017

(87) PCT Pub. No.: WO2016/169544
PCT Pub. Date: Oct. 27, 2016

(65) Prior Publication Data
US 2018/0100069 A1 Apr. 12, 2018

(30) Foreign Application Priority Data
Apr. 20, 2015 (DE) .......... 10 2015 105 983

(51) Int. Cl.
| | |
|---|---|
| C09D 4/06 | (2006.01) |
| B05D 1/02 | (2006.01) |
| C08F 222/10 | (2006.01) |
| C08F 222/14 | (2006.01) |
| C09D 135/02 | (2006.01) |
| B05D 1/04 | (2006.01) |
| B05D 3/02 | (2006.01) |
| B05D 7/24 | (2006.01) |

(52) U.S. Cl.
CPC ............ *C09D 4/06* (2013.01); *B05D 1/02* (2013.01); *B05D 1/045* (2013.01); *B05D 3/0254* (2013.01); *B05D 7/24* (2013.01); *C08F 222/1006* (2013.01); *C08F 222/14* (2013.01); *C09D 135/02* (2013.01); *C08F 222/102* (2020.02); *C08F 222/103* (2020.02)

(58) Field of Classification Search
None
See application file for complete search history.

(56) References Cited

U.S. PATENT DOCUMENTS

| | | | |
|---|---|---|---|
| 2002/0188072 A1 | 12/2002 | Kanakura et al. | |
| 2009/0326121 A1* | 12/2009 | Stockl | C08L 93/04 524/287 |
| 2013/0041091 A1* | 2/2013 | Brinkhuis | C08K 5/098 524/513 |
| 2014/0220252 A1 | 8/2014 | Brinkhuis et al. | |
| 2014/0221542 A1 | 8/2014 | Brinkhuis et al. | |
| 2014/0235785 A1 | 8/2014 | Brinkhuis et al. | |
| 2016/0024310 A1* | 1/2016 | McMullin | C09D 5/084 428/418 |

FOREIGN PATENT DOCUMENTS

| | | |
|---|---|---|
| CN | 103890049 A | 6/2014 |
| EP | 0 326 723 A1 | 8/1989 |
| EP | 1 245 590 A1 | 10/2002 |
| EP | 2 374 836 A1 | 10/2011 |
| KR | 10-2013-0050295 A | 5/2013 |
| WO | WO 2013/050574 A1 | 4/2013 |
| WO | WO 2013/050623 A1 | 4/2013 |

* cited by examiner

Primary Examiner — Michael P. Rodriguez
(74) Attorney, Agent, or Firm — Norman B. Thot

(57) ABSTRACT

A coating material for producing a coating includes 10 to 70 wt. % of at least one CH acidic compound, 4 to 40 wt. % of at least one vinylogous carbonyl compound, 0.1 to 15 wt. % of at least one latent-basic catalyst, 0.00001 to 10 wt. % of at least one light stabilizer, 0.00001 to 20 wt. % of at least one open time extender, 0.00001 to 20 wt. % of at least one pot life extender, 0.00001 to 70 wt. % of at least one of an inorganic pigment and an organic pigment, and 0.1 to 40 wt. % of at least one corrosion protection agent. Each wt. % of a respective ingredient is based on a total amount of the coating material

24 Claims, No Drawings

COATING SYSTEMS, USE THEREOF FOR COATING COMPONENTS AND THUS COATED COMPONENTS FOR AGRICULTURAL AND CONSTRUCTION MACHINES

CROSS REFERENCE TO PRIOR APPLICATIONS

This application is a U.S. National Phase application under 35 U.S.C. § 371 of International Application No. PCT/DE2016/000165, filed on Apr. 20, 2016 and which claims benefit to German Patent Application No. 10 2015 105 983.5, filed on Apr. 20, 2015. The International Application was published in German on Oct. 27, 2016 as WO 2016/169544 A1 under PCT Article 21(2).

FIELD

The present invention relates to improved coating materials based on RMA systems which cross-link with the aid of a classic Michael addition. The present invention also relates to the coatings producible therefrom and to the coated components, in particular to components for agricultural machinery and construction machinery, for example, parts of chassis, tools, or attachments.

BACKGROUND

Coating materials which cross-link in a Michael addition reaction have previously been described. The coatings produced therefrom have high weathering stability and chemical resistances. The rapid curing of these coating materials is achieved by the use of high catalyst content, wherein, however, the processing time or the pot life of the coating material is strongly reduced.

Rapid curing is particularly advantageous primarily during the coating or painting of large components, such as chassis parts. However, due to the size and shape of the surfaces, a relatively long time is required for coating the entire component so that the coating materials used must have long pot lives and long open times. In the following, "pot life" is designated as the time interval between mixing all components of a coating material and the time at which the cross-linking reaction in the coating material has progressed to the extent that the coating material may no longer be processed. In the following, "open time" is designated as the time interval in which a coating material film applied to a surface may be corrected without impairing the gradient properties.

During application of the coating material, the already coated areas must additionally be able to absorb the overspray that occurs during painting of the adjacent areas without surface defects forming, for example, due to a poor progression. In the following, "overspray" is designated as the material loss of the coating material caused during spray painting. The material loss may be caused by spraying past caused by an unfavorable orientation of the spray gun toward the workpiece or by strongly interrupted workpieces, such as grids. Overspray may also occur due to coating material drops flowing off laterally from the workpiece surfaces. Overspray absorption is thereby the property of an applied coating material to absorb material from an overspray so that the desired smooth surface of the film or coating is retained.

A very fast drying or curing is desired for the coating after application of the coating material film or the coating material layer. Forced drying at increased temperature is generally not possible for large components, as correspondingly large ovens would be required therefor. Fast drying at room temperature is therefore particularly desirable primarily for coating or painting very large components.

Binder systems cross-linking in a Michael addition, designated hereafter as "RMA systems", are described in EP 2374836 A1 and have a favorable ratio of pot life to drying time. The described binder systems show short drying times with long pot lives even at room temperature. Reference is thus specifically made to EP 2374836 A1 as a part of the description of the present invention. The disadvantage of known RMA systems is that the coating materials and coatings produced therefrom do not show the necessary and conventional properties.

SUMMARY

An aspect of the present invention is to provide improved coating materials, coatings, and coating systems based on RMA systems which are particularly suitable for coating large components such as chassis parts and tools of agricultural and construction machinery.

In an embodiment, the present invention provides a coating material for producing a coating which includes 10 to 70 wt. % of at least one CH acidic compound, 4 to 40 wt. % of at least one vinylogous carbonyl compound, 0.1 to 15 wt. % of at least one latent-basic catalyst, 0.00001 to 10 wt. % of at least one light stabilizer, 0.00001 to 20 wt. % of at least one open time extender, 0.00001 to 20 wt. % of at least one pot life extender, 0.00001 to 70 wt. % of at least one of an inorganic pigment and an organic pigment, and 0.1 to 40 wt. % of at least one corrosion protection agent. Each wt. % of a respective ingredient is based on a total amount of the coating material.

DETAILED DESCRIPTION

The coating materials according to the present invention comprise an RMA system which has one or more CH acidic compounds A, one or more vinylogous carbonyl compounds B, and one or more catalysts C. The coating materials additionally contain at least one or more light stabilizers, one or more pot life extenders, one or more open time extenders, one or more inorganic and/or organic pigments, and one or more corrosion protection agents.

In the following, the expression "light stabilizer" is understood to refer to additives and adjuvants that protect coatings from the influence of UV light, in particular additives and adjuvants that prevent or at least significantly delay polymer degradation caused by UV radiation. The expression "pot life extenders" are understood to refer to additives and adjuvants which, as components of the ready to be used mixed coating material, delay the curing of the coating material prior to application. Pot life extenders evaporate during application so that the curing of the applied coating material is not affected, in particular, is not extended. The expression "open time extenders" is understood to refer to additives and adjuvants which also remain in the coating material even after application and delay curing for the coating. The expression "corrosion protection agent" is understood to refer to additives and adjuvants which prevent or at least delay corrosion of the metal at the interface of the metal substrate and the coating.

The coating materials according to the present invention contain at least:

10 to 70, for example, 15 to 60, for example, 20 to 55 wt. % CH acidic compounds A;

4 to 40, for example, 8 to 35, for example, 10 to 30 wt. % vinylogous carbonyl compounds B;

0.1 to 15, for example, 0.2 to 10, for example, 0.3 to 5 wt. % latent-basic catalysts C;

0.00001 to 10, for example, 0.5 to 5, for example, 1 to 3 wt. % light stabilizers;

0.00001 to 20, for example, 0.01 to 10, for example, 0.1 to 5 wt. % open time extenders;

0.00001 to 20, for example, 0.01 to 15, for example, 0.1 to 10 wt. % pot life extenders;

0.1 to 65, for example, 5 to 55, for example, 8 to 40 wt. % inorganic and/or organic pigments; and 0.1 to 40, for example, 1 to 35, for example, 3 to 30 wt. % corrosion protection agents, wherein, the indicated amounts respectively relate to the total amount of the coating material.

According to the present invention, the compounds A and B are used in a molar ratio A:B of 0.5:1 to 2:1, for example, of 0.75:1 to 1.6:1, for example, of 0.9:1 to 1.3:1, for example, of 0.95:1 to 1.1:1, wherein the molar amounts refer to the acidic protons of the compounds A and to the vinylogous carbonyl groups of the compounds B.

According to the present invention, the catalysts C and compounds A are used in a molar ratio C:A of 0.8:1 to 2.5:1, for example, 1.1:1 to 1.9:1, for example, 1.3:1 to 1.7:1, wherein the molar amounts refer to the cation $X^+$ of catalyst C and the acidic protons of the compounds A.

Suitable CH acidic compounds A are compounds with the general Formula I

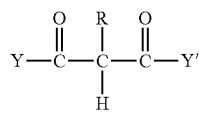

I wherein,

R is hydrogen, an alkyl radical or an aryl radical, and

Y, Y' are alkyl radicals, aralkyl radicals, aryl radicals, alkoxy radicals or amino groups, for example, primary amino groups, and Y and Y' may be the same or different.

Furthermore, the —C(=O)—Y and/or —C(=O)—Y' groups from Formula I may be replaced by CN— or aryl groups.

According to the present invention, malonic acid esters, acetoacetic acid esters, or mixtures thereof can, for example, be used. Malonic acid esters can, for example, be used with oligomer and polymer substituents, for example, based on polyesters, polyurethanes, polyacrylates, epoxy resins, polyamides, or polycarbonates. Malonic acid esters can, for example, be used with oligomer and polymer substituents based on polyesters, polyurethanes, and/or polycarbonates. Acetoacetic acid esters can, for example, be used which contain oligomer and polymer substituents, for example, based on polyalcohols, polyvinyl alcohols, epoxy resins, hydroxy-functional polyethers, polyesters, or polyacrylates. Acetoacetic acid esters can, for example, be used with oligomer and polymer substituents based on polyesters and/or polyacrylates. Compounds selected from the group containing malonic acid esters with oligomer and polymer substituents based on polyesters, which are obtained from the reaction of at least malonic acid, malonic acid dimethyl ester, and/or malonic acid diethyl ester with hexahydrophthalic acid and/or its anhydride and neopentyl glycol, and acetoacetic acid esters with oligomer and polymer substituents based on polyesters, which are obtained from the reaction of at least acetoacetic acid, acetoacetic acid methyl ester, and/or acetoacetic acid ethyl ester with hexahydrophthalic acid and/or its anhydride and neopentyl glycol can, for example, be used.

Suitable vinylogous carbonyl compounds B are, for example, acrylates and/or maleates, for example, unsaturated acryloyl-functional compounds. According to the present invention, acrylesters can, for example, be used that are made from compounds containing 1 to 20 carbon atoms and at least 2, for example, 2 to 6 hydroxyl groups. According to the present invention, polyesters can, for example, be used that are obtained from reacting maleic acid, fumaric acid, and/or itaconic acid, or anhydrides thereof with di- or polyvalent hydroxyl compounds which may contain a monovalent hydroxyl- or carboxyl compound. Resins can, for example be used, for example, polyesters, polyurethanes, polyethers, and/or alkyd resins which correspondingly contain activated unsaturated groups, for example, urethane acrylates, polyether acrylates, polyfunctional polyacrylates, polyalkylmaleates, and polyacrylates that are obtained from the reaction of acrylic acid with epoxy resins. According to the present invention, butanediol diacrylate, hexanediol diacrylate, trimethylolpropane triacrylate, entaerythritol tetraacrylate, di (trimethylolpropane) tetraacrylate, dipentaerythritol hexaacrylate, dipropylene glycol diacrylate, and tripropylene glycol diacrylate can, for example, be used.

Suitable latent-basic compounds for the catalysts C are, for example, substituted carboxylic acid salts of Formula II:

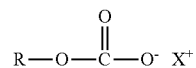

II wherein,

R is hydrogen, an alkyl or aryl (Ar—R), or a polymer, $X^+$ is an alkali earth metal cation or an alkaline earth metal cation, for example, lithium, sodium, or potassium, or a quaternary ammonium or phosphonium salt of the formula $(R')_4Y^+$, where, Y is nitrogen or phosphorus, R' is the same or different, is hydrogen, an alkyl or aryl, or a polymer, and where, R and R' may form a ring structure, or, R and R' may be a polymer.

According to the present invention, R can, for example, be an alkyl group or an aralkyl group, for example, an alkyl group with 1 to 4 carbon atoms. The carbonate group and the cation $X^+$ may also additionally be present on a molecule with the corresponding structure. Furthermore, R' can, for example, be an alkyl group, for example, an alkyl group with 1 to 4 carbon atoms, for example, with 3 to 4 carbon atoms. According to the present invention, ammonium and/or phosphonium carbonate can, for example, be used. Suitable ammonium carbonates are, for example, tetrahexylammonium methyl carbonate, tetrahexylammonium hydrogen carbonate, tetradecanyl trihexylammonium methyl carbonate, tetradecylammonium methyl carbonate, tetrabutylammonium methyl carbonate, tetrabutylammonium ethyl carbonate, tetrabutylammonium hydrogen carbonate, tetrapropylammonium methyl carbonate, tetrapropylammonium ethyl carbonate, tetrapropylammonium hydrogen carbonate, benzyltrimethylammonium methyl carbonate, trihexylmethylammonium methyl carbonate, or trioctylmethylammonium methyl carbonate. Tetrabutylammonium methyl carbonate, tetrabutylammonium ethyl carbonate, tetrabutylammonium hydrogen carbonate, tetrapropylammonium methyl carbonate, tetrapropylammonium ethyl carbonate, tetrapropylammonium hydrogen carbonate, and mixtures thereof can, for example, be used.

Suitable light stabilizers are radical scavengers such as sterically inhibited aliphatic amines, for example, based on substituted 2,2,6,6-tetramethylpiperidines, UV absorbers such as 2-hydroxyphenyl benzotriazoles, 2-hydroxybenzophenones, 2-hydroxyphenyltriazines, or oxalanilides, and quenchers such as organic nickel compounds and peroxide decomposers such as thioethers or phosphites. Radical scavengers, for example, sterically inhibited aliphatic amines based on substituted 2,2,6,6-tetramethylpiperidines, and/or UV absorbers, for example, 2-hydroxyphenyl benzotriazoles, 2-hydroxybenzophenones, 2-hydroxyphenyltriazines, and oxalanilides can, for example, be used. Substituted 2,2,6,6-tetramethylpiperidines, 2-hydroxyphenyltriazines, 2-hydroxybenzophenones, and mixtures thereof can, for example, be used.

Suitable pot life extenders are short-chain alcohols which have an evaporation number below 35, for example, below 20. Alcohols are particularly suited which have up to 6, for example, up to 4, for example, up to 3 carbon atoms. Thus, for example, methanol, ethanol, n-propanol, i-propanol, n-butanol, i-butanol, and mixtures thereof can, for example, be used according to the present invention.

Suitable open time extenders are basic NH-functional compounds with a $pK_a$ value between 4 and 14. Succinimides, 1,2,4, -triazoles, 1,2,3, -benzotriazoles, 5,5-diphenylhydantoins, hydantoins, (RS)-3-ethyl-3-methylpyrrolidine-2,5-dione, and mixtures thereof can, for example, be used. Succinimides, 1,2,4, -triazoles, 1,2,3, -benzotriazoles, and mixtures thereof can, for example, be used.

Suitable inorganic pigments are, for example, titanium dioxide, iron oxides, chromium oxides, chromium titanates, bismuth vanadate, cobalt blue, and carbon blacks. Titanium dioxide, iron oxides, and carbon blacks can, for example, be used as inorganic pigments. Suitable organic pigments are, for example, pigment yellow 151, pigment yellow 213, pigment yellow 83, pigment orange 67, pigment orange 62, pigment orange 36, pigment red 170, pigment violet 19, pigment violet 23, pigment blue 15:3, pigment blue 15:6, pigment green 7. Pigment yellow 151, pigment orange 67, pigment red 170, pigment violet 19, pigment blue 15:3, and pigment green 7 can, for example, be used.

Suitable corrosion protection agents are tannin derivatives, basic sulfonates, nitrocarboxylates, such as aminocarboxylate, and zinc salts of organic nitric acids, such as zinc-nitroisophthalate, or zinc salts of cyanuric acid. Additional suitable corrosion protection agents are anti-corrosive pigments, such as iron mica, aluminum pigments, or talc, and active pigments which cause electrochemical passivation of the metal surface, such as phosphates, borates, silicates, molybdates, or chromates. According to the present invention, active pigments, for example, phosphates with zinc-, aluminum-, magnesium-, zirconium-, and strontium cations, and hybrid forms thereof, can, for example, be used. Aluminum magnesium phosphates, aluminum zinc phosphates, and aluminum strontium phosphates can, for example, be used.

In embodiment of the present invention, additional additives and adjuvants can, for example, be added to the coating materials, such as dispersing additives, fillers, and/or matting agents, in order to improve the required properties of the coating material and/or of the coating.

The coating materials according to the present invention can, for example, contain up to 25, for example, 0.00001 to 8, for example, 0.00001 to 5 wt. % dispersing additives, wherein the indicated amounts respectively relate to the total amount of coating material. Suitable dispersing agents can, for example, be high molecular weight block copolymers with pigment affinic groups, highly branched polyester or acrylate polyester copolymers with pigment affinic groups. Dispersing additives are high molecular weight block copolymers with pigment affinic groups can, for example, be used.

The coating materials according to the present invention may additionally contain up to 60, for example, 0.00001 to 40, for example, 10 to 30 wt. % fillers, wherein the indicated amounts respectively relate to the total amount of the coating material. Suitable fillers can, for example, be carbonates such as chalk, limestone, calcite, precipitated calcium carbonate, dolomite or barium carbonate, sulfates such as barite, barium sulfate, or calcium sulfate, fibers from melts of glass or basalts, glass powder, glass beads, and slags. Barium sulfate and/or calcium carbonate as fillers can, for example, be used.

The coating materials according to the present invention may additionally contain up to 30, for example, 0.00001 to 20, for example, 0.00001 to 10 wt. % matting agents, wherein the indicated amounts respectively relate to the total amount of the coating material. The expression "matting agent" is understood to refer to additives and adjuvants that reduce the gloss of a coating or generate a matte gloss. Matting agents generate the surface structure necessary therefor in the coating without affecting other features and properties. Suitable matting agents are, for example, micronized amorphous silicas, such as silica gels or precipitated silicas, micronized and precipitated waxes, such as polyethylene waxes, polypropylene waxes, polyamide waxes, or PTFE waxes, and also micronized polymers, such as urea aldehyde resin. Micronized and precipitated polyethylene waxes, polypropylene waxes, polyamide waxes, PTFE waxes, and micronized urea aldehyde resin can, for example, be used as matting agents.

In an embodiment of the present invention, the coating materials can, for example, contain up to 50, for example, 0.00001 to 30, for example, 0.00001 to 20 wt. % aprotic solvents, wherein the indicated amounts respectively relate to the total amount of the coating material. The expression "aprotic solvents" is understood in the following to refer to solvents that contain no ionisable protons in the molecule. Suitable aprotic solvents are, for example, aliphatic hydrocarbons, cycloaliphatic hydrocarbons, aromatic hydrocarbons, ketones, esters, ethers, ether esters, in particular, ethylacetate, butyl acetate, acetone, n-butanone, methyl isobutyl ketone, methoxypropyl acetate, and dimethyl sulfoxide. Ethylacetate, butyl acetate, acetone, n-butanone, methyl isobutyl ketone, methoxypropyl acetate, and mixtures thereof, can, for example, be used as solvents.

The compounds used as catalysts C according to the present invention are latent bases, as the carbonate according to Formula II is in equilibrium with its disassociation products, carbon dioxide and the corresponding hydroxide- or alkoxy base. As long as carbon monoxide cannot escape from the system, the equilibrium lies more strongly in favor of the carbonate. Only when a carbon dioxide is removed, and thus a sufficient amount of base is present, does the cross-linking begin with the aid of the Michael addition.

During storage of the coating materials according to the present invention in closed containers, from which carbon dioxide cannot escape, the coating material according to the present invention may basically be formulated as a single component system. The shelf life can, however, be increased if the individual components of the coating material according to the present invention are formulated in multicomponent systems. A catalyst component which contains the catalysts C is thus, for example, only mixed shortly before processing with the binder components which contain the CH acidic compounds A and the vinylogous carbonyl compounds B.

According to the present invention, the CH acidic compounds A and the vinylogous carbonyl compounds B may be contained in a binder component together with the light stabilizers, open time extenders, and pot life extenders used. This binder component may additionally contain pigments, fillers, corrosion protection agents, and additionally other additives such as solvents. The catalysts C and, if necessary, other solvents and pot life extenders may be contained in a catalyst component. In an embodiment, the CH acidic compounds A can, for example, be present in a first binder component, the vinylogous carbonyl compounds B in a second binder component, and the catalysts C in a catalyst component. In one such three-component system, the CH acidic compounds A are contained in the first binder component together with the open time extenders and light stabilizers. If necessary, this first binder component may additionally contain pigments, fillers, and corrosion protection agents, and additional additives. The vinylogous carbonyl compounds B can, for example, be contained in the second binder component. The second binder component may also contain pigments, fillers, corrosion protection agents, and additional additives. The catalysts C are contained in the catalyst component. The catalyst component may also contain solvents and pot life extenders.

The addition of additional components which are customary for producing a coating reduces the shelf life of RMA systems. The coating materials according to the present invention with their particular selection of light stabilizers, open time extenders, pot life extenders, pigments, corrosion protection agents, dispersing agents, functional fillers, matting agents, and aprotic solvents, have an unexpectedly high shelf life compared to previously known coating materials based on RMA systems.

The properties of coatings which are produced from coating materials based on RMA systems are furthermore strongly compromised by the presence of other components of the coating material, in contrast to coatings which are produced from coating materials based on conventional binders, for example, epoxy resins or polyurethanes. It has surprisingly been demonstrated that the coating materials according to the present invention result in coatings which have properties necessary for use for components of construction and agricultural machinery, in particular mechanical stabilities, even at high coating thicknesses, and corrosion resistance.

In an embodiment, the coating materials according to the present invention contain at least:
- 10 to 70, for example, 15 to 60, for example, 20 to 55 wt. % of CH acidic compounds A, for example, malonic acid esters with oligomer and polymer substituents based on polyesters, which are obtained from the reaction of at least malonic acid, malonic acid dimethyl ester, and/or malonic acid diethyl ester with hexahydrophthalic acid and/or its anhydride and neopentyl glycol, and acetoacetic acid esters with oligomer and polymer substituents based on polyesters, which are obtained from the reaction of at least acetoacetic acid, acetoacetic acid methyl ester, and/or acetoacetic acid ethyl ester with hexahydrophthalic acid and/or its anhydride and neopentyl glycol;
- 4 to 40, for example, 8 to 35, for example, 10 to 30 wt. % vinylogous carbonyl compounds B, for example, butanediol diacrylate, hexanediol diacrylate, trimethylolpropane triacrylate, pentaerythritol tetraacrylate, di(trimethylolpropane)tetraacrylate, and/or dipentaerythritol-hexaacrylate;
- 0.1 to 15, for example, 0.2 to 10, for example, 0.3 to 5 wt. % catalysts C, for example, tetrabutylammonium methyl carbonate, tetrabutylammonium ethyl carbonate, tetrabutylammonium hydrogen carbonate, tetrapropylammonium methyl carbonate, tetrapropylammonium ethyl carbonate, tetrapropylammonium hydrogen carbonate, and mixtures thereof;
- 0.00001 to 10, for example, 0.5 to 5, for example, 1 to 3 wt. % light stabilizers, for example, substituted 2,2,6,6-tetramethylpiperidines, 2-hydroxyphenyltriazines, 2-hydroxybenzophenones, and mixtures thereof;
- 0.00001 to 20, for example, 0.01 to 10, for example, 0.1 to 5 wt. % open time extenders, for example, succinimides, 1,2,4, -triazoles, 1,2,3, -benzotriazoles, and mixtures thereof;
- 0.00001 to 20, for example, 0.01 to 15, for example, 0.1 to 10 wt. % pot life extenders, for example, methanol, ethanol, n-propanol, i-propanol, n-butanol, i-butanol, and mixtures thereof;
- 0.00001 to 70, for example, 0.01 to 65, for example, 0.1 to 40 wt. % inorganic and/or organic pigments, for example, titanium dioxide, iron oxides, carbon blacks, pigment yellow 151, pigment orange 67, pigment red 170, pigment violet 19, pigment blue 15:3, pigment green 7, and mixtures thereof;
- 0.1 to 40, for example, 1 to 35, for example, 3 to 30 wt. % corrosion protection agents, for example, aluminum magnesium phosphates, aluminum zinc phosphates, and aluminum strontium phosphates;
- 0 to 25, for example, 0.00001 to 8, for example, 0.00001 to 5 wt. % dispersing additives, for example, high molecular weight block copolymers with pigment affinic groups;
- 0 to 25, for example, 0.00001 to 15, for example, 0.5 to 10, for example, 8 to 15 wt. % matting agents, for example, micronized and precipitated polyethylene waxes, polypropylene waxes, polyamide waxes, PTFE waxes, and micronized urea aldehyde resin, and mixtures thereof;
- 0 to 60, for example, 0.00001 to 40, for example, 0.00001 to 30 wt. % functional fillers, for example, barium sulfate and/or calcium carbonate; and
- 0 to 50, for example, 0.00001 to 40, for example, 0.00001 to 30 wt. % aprotic solvents, for example, ethylacetate, butyl acetate, acetone, n-butanone, methyl isobutyl ketone, methoxypropyl acetate, and mixtures thereof, wherein, the indicated amounts respectively relate to the total amount of the coating material.

The coating materials according to the present invention have a surprisingly higher shelf life compared to previously known RMA coating materials and RMA coatings. They also show improved drying behavior. Coatings obtained from the coating materials according to the present invention additionally have an improved light stability, in particular less yellowing and higher gloss retention.

The coating materials according to the present invention have pot lives greater than or equal to 1 hour, for example, greater than or equal to 2 hours, for example, between 2 and 4 hours. The pot life is generally determined via the flow time from a flow cup. The end of the pot life is determined as the point at which the flow time shows double the value of the starting flow time. The testing method is described below in detail in the Examples. The coating materials according to the present invention also demonstrate open times of greater than or equal to 15 minutes, for example, greater than or equal to 20 minutes, for example, greater than or equal to 25 minutes. In addition to the long pot lives and open times, the coating materials according to the present invention surprisingly demonstrate an unusually broad climate window in which they may be processed without deterioration. They are processable, for example, at temperatures up to 45° C. and at relative air humidity of up to 99%. They also demonstrate a long overspray absorption, for example, over a time interval of more than 25 minutes.

In contrast to conventionally used coating materials based on polyurethane, the coating materials according to the present invention have significantly reduced drying times. In an embodiment, the coating materials according to the present invention can, for example, be used to produce a coating on substrates, for example, metals, plastic materials, or fiber composite materials. Metals are particularly suited, for example, steels and iron alloys, aluminum, and aluminum alloys. The component surfaces to be coated may be provided with a primer, for example, the conventional primers known to the person skilled in the art based on epoxy resins or polyurethanes. They may also be pre-treated as is conventional and familiar to the person skilled in the art. Preferred pre-treatments are iron phosphating, zinc phosphating, conversion layers based on manganese, zirconium, or silicon compounds, sand blasting, galvanizing, or electro-dip priming. Conversion layers based on manganese, zirconium, or silicon compounds can, for example, be used as pretreatment layers. The coatings according to the present invention also demonstrate a good adhesion to pre-treated substrates. They additionally have a high anti-corrosion effect.

The coatings according to the present invention also demonstrate optically flawless surfaces even at high coating thicknesses. They may have dry coating thicknesses between 80 and 150 µm. The application of the coating materials according to the present invention may be carried out within a large coating thickness interval without compromising the surface quality of the coating. The coating materials according to the present invention and coatings are thus less sensitive with respect to overlayer thicknesses, which may occur during the application, for example, due to an unfavorable geometry of the substrate.

Due to their properties, the coating materials according to the present invention may in particular be used for the production of single-layer lacquers. They are additionally suited for use for coating large components, in particular for coating large area components made of metal, for example, chassis for construction and agricultural machinery.

The present invention also relates to a method for coating components. The method according to the present invention thereby comprises the steps: (a) applying the coating material according to the present invention to a surface of a substrate; and, (b) curing the applied coating material for 0.5 to 12, for example, 0.5 to 6, for example, 0.5 to 4 hours at temperatures between 5 and 50, for example, 15 and 40, for example, 20 and 35° C.

The coating materials according to the present invention have an above-average solids content and correspondingly contain low proportions of volatile organic substances, for example, solvents. The solids content is defined as the proportion by mass of a coating material that remains as residue after 30 minutes during evaporation at 105° C. Essentially, the solids generally comprise binders, non-volatile additives, pigments, and fillers. The solids content of the coating materials according to the present invention lie between 65 and 95, for example, 70 and 90, for example, between 75 and 85 wt. %, relative to the total weight of the coating materials.

Conventionally, rough and matte surfaces are obtained using conventional spraying methods in the case of processing of coating materials with high solids content. In contrast, the coating materials according to the present invention also yield surprising high-quality surfaces even during an application by hydraulic very high pressure spraying (airless), airless spraying with air support (airmix), and pneumatic spraying or compressed air spraying. All spraying methods may thereby be used, including electrostatically supported.

In an embodiment of the method of the present invention, all components of the coating material used can, for example, be mixed prior to application. The mixing may thereby be carried out manually or by machine.

As the coating materials according to the present invention may be cured at room temperature, they are primarily suited for coating large components, as they are used, for example, to build agricultural and construction machinery. They may, for example, be used for coating chassis parts, roofs, doors, chassis cladding, lattice masts, jibs, grippers, blades, cutters, or ploughshares.

Examples

The production of the coating materials is carried out according to coating technology standards which are known and familiar to the person skilled in the art. The catalyst solution used in Example Recipe 1 is produced in that 42.8 g diethyl carbonate and 26.1 g i-propanol are added to a solution of 17.1 g tetra butyl ammonium hydroxide in 14 g water.

Table of Example Recipe 1: Topcoat

| Substance | Amount [wt. %] |
|---|---|
| Filler component 1 | |
| Malonate functional polyester with a concentration of acidic protons of 5.66 mol/kg relative to the solvent-free polyester, 85% in butyl acetate. | 27 |
| Magnesium aluminium polyphosphate | 5 |
| High molecular weight block copolymer with pigment affinic groups | 1 |
| Bis(1,2,2,6,6-pentamethyl-4-piperidinyl)-sebacate | 1 |
| Succinimide | 1 |
| Butyl acetate | 5 |
| Barium sulphate | 22 |
| Filler component 2 | |
| Di(trimethylolpropane) tetraacrylate | 12 |
| Hexanediol diacrylate | 3 |
| Pigment yellow 213 | 4 |
| Titanium dioxide | 10 |
| High molecular weight block copolymer with pigment affinic groups | 1 |
| Catalyst component | |

-continued

Table of Example Recipe 1: Topcoat

| Substance | Amount [wt. %] |
|---|---|
| Catalyst solution | 3 |
| Ethanol | 2 |
| Methyl ethyl ketone | 3 |

The pot life and the drying time of Example Recipe 1 were determined to evaluate the shelf life of the coating materials Samples were thereby tested or used to produce a coating after 1 day of storage at 23° C., after 28 days of storage at 40° C., and after 1 year of storage at 20 through 23° C., respectively.

Determination of pot life: The pot life was determined using a flow cup. In this method, a liquid is filled into a cup with a defined volume, which has a defined nozzle in its bottom. The coating material runs out through the nozzle, wherein the time from the discharge of the liquid jet up until the liquid jet breaks off is measured as the flow time. All preparations and measurements are carried out at a temperature of 23° C. Initially, all components of the coating material are mixed and the flow time of the mixture is immediately measured (initial flow time). The measurement is repeated at regular intervals. The end of the pot life is reached when the flow time is double the initial flow time.

Determination of drying time: To determine the drying time, a drying time recorder, a drying time measurement device from BYK Gardner, was used. For this purpose, the coating material to be examined is uniformly applied on glass strips with the aid of a film drawer. The glass strips are subsequently laid in a linear recorder. Needles are then applied to the coating and drawn across the drying film at a defined, constant speed. A characteristic drying image of the coating is thereby created, in which the individual time segments show the different curing states: flow or open time, initial trace, film tearing, and surface track. The curing of the coating material thereby begins at the end of the open time, i.e., at the point at which the track etched by the needle remains visible in the applied film. It ends with the surface track, i.e., at the time at which the needle no longer leaves a visible track in the applied film.

The quality of the coatings which are produced from the differently stored coating materials from Example Recipe 1 was also examined to determine shelf life of the coating material. Gloss and corrosion resistance were determined for this purpose. Samples were used to produce a coating after 1 day of storage at 23° C., after 28 days of storage at 40° C., and after 1 year of storage at 20 through 23° C., respectively. To produce the sample bodies, Example Recipe 1 was applied to treated steel plates using cup guns and cured at room temperature. As a pre-treatment, the steel plates were provided with a silane conversion layer.

Determination of surface gloss: The gloss of the coating surface is determined as a reflectometer value. The reflectometer value of a sample is defined as the ratio of the light beams reflected by the sample surface and a glass surface with a refractive index of 1,567 in the mirror direction. The measurement values are determined with the aid of a conventional refractometer at an angle of 60°.

Determination of corrosion resistance: Salt spray tests were carried out to evaluate the corrosion resistance. For this purpose, the coatings of the sample bodies were cut with cross shapes down to the metal surface. The sample bodies were subsequently exposed in a spray chamber to a salt spray mist made from a 5% salt solution with a pH value between 6.5 and 7.2 over a time period of 500 hours at 35±2° C. Afterwards, the sample bodies were rinsed with clear water and subsequently conditioned at room temperature for 1 hour. The damage from infiltration is evaluated. For this purpose, the loose parts of the coating are carefully removed at the cuts. In each case, the broadest area of delamination is determined and indicated in millimetres.

TABLE

Shelf life of Example Recipe 1

| Storage | 1 day, 23° C. | 28 days, 40° C. | 1 year, 20-23° C. |
|---|---|---|---|
| Pot life | 3 h | 3 h | 3 h |
| Open time | 20 min | 21 min | 22 min |
| Surface track ends | 247 min | 238 min | 241 min |
| Gloss | 89 | 90 | 88 |
| Width of delamination | 0.5-2.5 mm | 1-2.5 mm | 1-2 mm |

As the table shows, the coating materials according to the present invention have a high shelf life. After longer storage at increased temperatures, the coating materials themselves do not demonstrate a deterioration in their processability. The coatings produced therefrom also show no impairment to their properties.

The present invention is not limited to embodiments described herein; reference should be had to the appended claims.

What is claimed is:

1. A coating material for producing a coating, the coating material comprising:
   10 to 70 wt. % of at least one CH acidic compound;
   4 to 40 wt. % of at least one vinylogous carbonyl compound;
   0.1 to 15 wt. % of at least one latent-basic catalyst;
   0.00001 to 10 wt. % of at least one light stabilizer;
   0.00001 to 20 wt. % of at least one open time extender;
   0.00001 to 20 wt. % of at least one pot life extender;
   0.00001 to 70 wt. % of at least one of an inorganic pigment and an organic pigment; and
   0.1 to 40 wt. % of at least one corrosion protection agent,
   wherein,
   the at least one open time extender is selected from a basic NH-functional compound with a pKa value of between 4 and 14, and
   each wt. % of a respective ingredient is based on a total amount of the coating material.

2. The coating material as recited in claim 1, wherein the at least one CH acidic compound is a compound of the formula

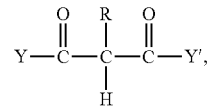

wherein,
R is hydrogen, an alkyl radical, or an aryl radical,
Y is an alkyl radical, an aralkyl radical, an aryl radical, an alkoxy radical, or an amino group, and
Y' is an alkyl radical, an aralkyl radical, an aryl radical, an alkoxy radical, or an amino group.

3. The coating material as recited in claim 1, wherein the at least one vinylogous compound is an acrylate, a maleate, or mixtures thereof.

4. The coating material as recited in claim 1, wherein the at least one latent-basic catalyst is at least one substituted carboxylic acid salt of the formula

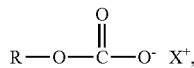

wherein,
R is hydrogen, an alkyl radical, an aryl radical, or a polymer radical,
X$^+$ is an alkali earth metal cation, an alkaline earth metal cation, or a quaternary ammonium salt of the formula (R')$_4$Y$^+$ or a phosphonium salt of the formula (R')$_4$Y$^+$, wherein,
Y is nitrogen or phosphorus,
R' is the same or different, is hydrogen, an alkyl radical, an aryl radical, an aralkyl radical, or a polymer, and
R and R' form a ring structure or are a polymer.

5. The coating material as recited in claim 1, wherein the at least one light stabilizer is selected from a radial scavenger, a UV absorber, a quencher, and a peroxide decomposer.

6. The coating material as recited in claim 1, wherein the at least one pot life extender is selected from an alcohol comprising up to 6 carbon atoms and an evaporation number below 35.

7. The coating material as recited in claim 1, wherein the at least one of an inorganic pigment and an organic pigment is selected from a titanium dioxide, an iron oxide, a chromium oxide, a chromium titanate, a bismuth vanadate, cobalt blue, a carbon black, pigment yellow 151, pigment yellow 213, pigment yellow 83, pigment orange 67, pigment orange 62, pigment orange 36, pigment red 170, pigment violet 19, pigment violet 23, pigment blue 15:3, pigment blue 15:6, and pigment green 7.

8. The coating material as recited in claim 1, wherein the at least one corrosion protection agent is selected from a tannin derivative, a basic sulfonate, a nitrocarboxylate, a zinc salt of an organic nitric acid, an anti-corrosive pigment, and an active pigment.

9. The coating material as recited in claim 1, wherein the coating material further comprises:
up to 25 wt. % of at least one dispersing additive.

10. The coating material according to claim 9, wherein the at least one dispersing additive is selected from a high molecular weight block copolymer with pigment affinic groups, a highly branched polyester, and an acrylate polyester copolymer with pigment affinic groups.

11. The coating material as recited in claim 1, wherein the coating material further comprises:
up to 60 wt. % of at least one filler.

12. The coating material as recited in claim 11, wherein the at least one filler is selected from a carbonate, a sulfate, a silicate, and a silica.

13. The coating material as recited in claim 1, wherein the coating material further comprises:
up to 50 wt. % of at least one aprotic solvent.

14. The coating material as recited in claim 13, wherein the at least one aprotic solvent is selected from an aliphatic hydrocarbon, a cycloaliphatic hydrocarbon, an aromatic hydrocarbon, a ketone, an ester, an ether, and an ether ester.

15. The coating material as recited in claim 1, wherein the coating material further comprises:
up to 10 wt. % of at least one matting agent.

16. The coating material as recited in claim 15, wherein the at least one matting agents is selected from a micronized amorphous silica, a micronized wax, a precipitated wax, and a micronized polymer.

17. A method of using the coating material as recited in claim 1 in a single-layer coating system, the method comprising;
providing the coating material as recited in claim 1; and
incorporating the coating material into the single-layer coating system.

18. The method as recited in claim 17, wherein the singe-layer coating system is a topcoat for components of at least one of construction machinery and agricultural machinery.

19. A method for coating a component, the method comprising:
applying the coating material as recited in claim 1 to a substrate; and
curing the coating material for 0.5 to 12 hours at a temperature of between 5 and 50° C.

20. The method as recited in claim 19, wherein the applying of the coating material is performed by a hydraulic spraying method or by a pneumatic spraying method.

21. The method as recited in 19, further comprising;
mixing the respective ingredients of the coating material prior to applying the coating material.

22. The method as recited in claim 19, wherein the coating material is applied to a pre-treated substrate.

23. A component comprising a coating produced from the coating material as recited in claim 1.

24. The component as recited in claim 23, wherein the component is a component of construction machinery or agricultural machinery.

* * * * *